United States Patent [19]
Bucklen

[11] 3,762,742
[45] Oct. 2, 1973

[54] ELECTRICALLY POSITIONED STEP FOR VEHICLES

[76] Inventor: Victor L. Bucklen, 5108 Pierce Rd., Bakersfield, Calif. 93308

[22] Filed: June 5, 1972

[21] Appl. No.: 259,448

[52] U.S. Cl. ............................................. 280/166
[51] Int. Cl. ............................................. B60r 3/02
[58] Field of Search ........................... 280/166, 164

[56] References Cited
UNITED STATES PATENTS

| 3,572,753 | 3/1971 | Claassen | 280/166 |
| 668,788 | 2/1901 | Wilson | 280/166 |
| 3,388,925 | 6/1968 | Chavira | 280/166 |
| 3,403,926 | 10/1968 | Way | 280/166 |

*Primary Examiner*—Robert R. Song
*Attorney*—Edmond F. Shanahan

[57] ABSTRACT

A step assembly for mounting to a vehicle frame under the vehicle door. The step assembly includes a rotatably mounted bracket which carries a tread plate. Also included in the assembly are a small reversible electric motor, a screw actuator for the movable bracket, and an electrical system which positions the step tread either in an extended position in front of and below the vehicle door, or in a retracted position nested against the frame of the vehicle. In its preferred form, the electrical system of the step assembly automatically moves the tread plate to extended position when the vehicle door is open, and retracts the tread plate to nested position when the vehicle door is closed.

3 Claims, 5 Drawing Figures

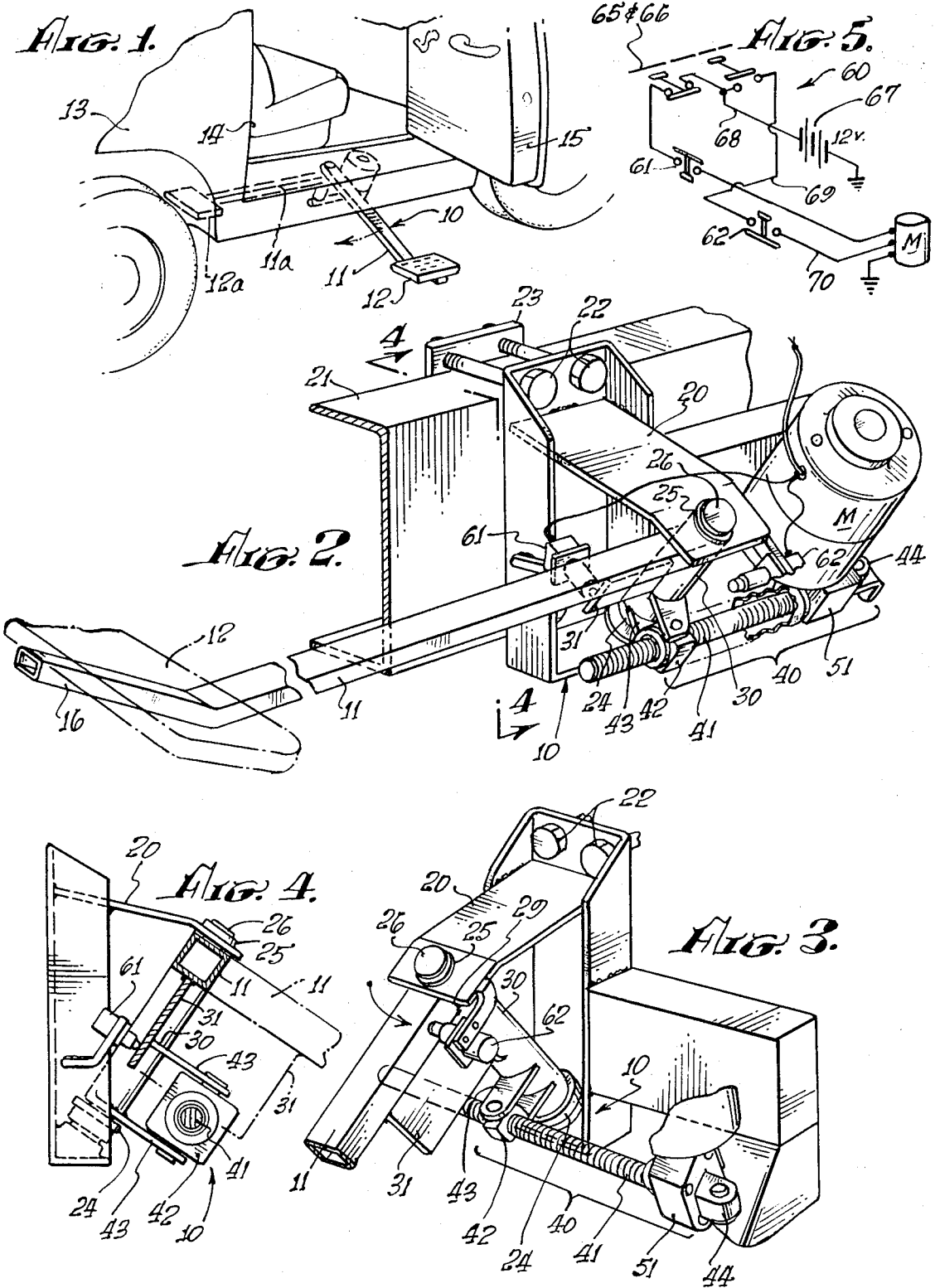

ELECTRICALLY POSITIONED STEP FOR VEHICLES

This invention relates to power operated, movable steps for vehicles, and more particularly to a step assembly which includes a bracket and tread plate rotatably movable about an oblique axis between an extended position and a retracted position nested against the frame of the vehicle; and in which the step assembly includes an electrical system for moving the bracket and tread plate between the two positions, and for automatically positioning them in one or the other of the two positions.

In recent years, a large number of recreational vehicles have been developed and sold for use by the family, including women and children. Many of these recreational vehicles have four-wheel drive, and are characterized by vehicle door thresholds spaced from the ground at much greater elevation than the door threshold of a modern passenger automobile. In addition to four-wheel drive vehicles, many trucks used for campers, or station wagons used for recreational use, employ a truck chassis and truck wheels of large diameter, and are characterized by a road clearance much greater than that of the passenger automobile. Women wearing skirts, children, and elderly people encounter difficulty in climbing into such recreational vehicles without the aid of a step between ground and vehicle threshold. As a consequence, it is very common to provide such high-clearance recreational vehicles with an extra step of some kind. In most cases, the step employed is then welded directly to the vehicle frame in a permanent position which impairs road clearance, and may also constitute an illegal side projection from the vehicle. Some retractable steps have achieved market success, but all of these have been manually retracted or extended from outside the vehicle; consequently, at least one person would have no use of the vehicle step since he would have to push it into retracted position before entering the vehicle.

The present invention is an electrically operated step assembly which includes its own means for automatically positioning the tread plate of the step assembly in an extended step position below and outboard of the vehicle doorway, or in a retracted position nested against the vehicle frame, with little or no impairment of road clearance.

The retractable step of the present invention is more compact than the manually operated folding steps presently marketed for recreational vehicles. Whereas most past steps have employed some type of folding or telescoping mechanism, the present step relies on a bracket which rotates about an inclined axis through an angle of approximately 90°. The bracket of the step assembly here disclosed nests under the vehicle floor against the outboard side of the frame of the vehicle.

Most retractable steps presently known cannot be operated from inside the vehicle after the passengers have entered and closed the doors. The step assembly of the present invention can be operated electrically by the passengers from within the vehicle.

Moreover, in a preferred form, the step assembly of the present invention is operated automatically in response to opening or closing of the vehicle door. This eliminates the hazard of driving off with the vehicle step in extended position.

The foregoing and other objects and advantages of the step assembly of the present invention will best be understood from the following description of a preferred embodiment, which description should be read with reference to the accompanying drawings, in which:

FIG. 1 is a perspective view of a fragmentary portion of the right front door of a four-wheel drive truck, with portions of the body and door broken away to reveal the step assembly mounted on the frame, under the floor of the vehicle, and in a retracted position;

FIG. 2 is an enlarged perspective view of the operating mechanism of the step assembly, showing the bracket in extended position;

FIG. 3 is an enlarged perspective view of the step assembly, with the electrical motor removed for purposes of clear viewing of parts, showing the bracket in retracted position;

FIG. 4 is a mechanical detail of the bracket transporting mechanism; and

FIG. 5 is a wiring diagram of the preferred form of the step assembly, including automatic operation by the door of the vehicle.

In FIG. 1, a step assembly constructed according to the invention is indicated generally by the numeral 10, with a tread supporting bracket 11, and a tread 12 shown in full line, in extended position. FIG. 1 also shows the bracket 11 and tread 12 in retracted position, in dashed outline at 11-A and 12-A.

Step assembly 10 is seen in FIG. 1 mounted under a vehicle 13, typically, a four-wheel drive truck with high road clearance. The right side doorway 14 is illustrated with the door 15 in an open position. In the preferred form of the invention, opening of door 15 automatically causes the bracket 11 and tread 12 to be moved into extended position as illustrated in FIG. 1 at 11 and 12. A person desiring to enter the vehicle 13 can step from the ground to tread 12, and then through doorway 14 into vehicle 13.

Bracket 11 may be suitably constructed of rectangular steel tubing having suitable strength and rigidity. In its extended position, illustrated at 11 in FIG. 1, the main part of bracket 11 extends outwardly of the vehicle 13, and downwardly at an angle of about 30°, typically. The outboard end of bracket 11 is formed at an angle as indicated at 16 in FIG. 2 to provide, in extended position, a level support for tread 12. Typically, tread 12 is a steel plate, preferably provided with a slip-resistant surface 17, which is firmly attached to bracket extension 16 by welding.

In the enlarged perspective view of FIG. 2, the step assembly 10 is shown with bracket 11 and tread 12 (in phantom line) in retracted position.

The movable parts of step assembly 10 are movably mounted on a mounting-support structure 20, which is mounted to the vehicle frame 21 by mounting bolts 22 and a mounting plate 23. Mounting-support structure 20 must have the rigidity and strength to meet its functional requirements. In the particular form illustrated, it is a welded steel structure comprised of steel channel and steel bar sections.

The mounting-support structure provides a pair of mounting locations, lower mount 24 and upper mount 25, for the mounting of a stationary bracket shaft 26.

A sleeve 30 is freely rotatable on stationary bracket shaft 26. Bracket 11 has its inboard end 29 welded to sleeve 30, and, in the construction shown, the rigidity and security of attachment of bracket 11 to sleeve 30 is increased by a welded buttress plate 31.

The mounting-support structure 20 supports the stationary shaft 26 and the rotating sleeve 30 on an axis which inclines upwardly and outwardly to place tread 12 in the proper location when extended as shown in FIG. 1 and in the proper nested location as indicated at 12-A in FIG. 1, when retracted.

Sleeve 30 functions as a tubular, rotatable bracket shaft, whereas stationary bracket shaft 26 functions as a "bracket shaft bearing means." While the construction thus illustrated and described is preferred in the invention, it will be understood that the invention also includes constructions which might utilize a solid, rotatable bracket shaft with a pair of bearing means, one at each end. The general terminology of the claims appended to this specification are to be understood as including both of the foregoing possibilities and any other form of shaft and bearing design known to engineering as suitable for the application described.

A screw actuator system, indicated collectively by the numeral 40 (FIGS. 2 and 3), is used to rotate the rotating sleeve 30 between the retracted position of FIG. 2 and the extended position of FIG. 3.

The acutator system 40 is comprised of an actuating screw 41, which is threadably received through a traveling nut 42, the latter being mounted at the end of an actuator arm 43 on sleeve 30.

Actuator screw 41 is pivotally mounted to support structure 20 by means of a screw pivot mount 44, which has an axis of rotation parallel with the axis of rotation of the bracket shaft sleeve 30 but spaced forwardly of sleeve 30 under the vehicle 13.

Drive is accomplished by means of a reversible motor 50, which operates on the screw 41 through a drive gear 51. It will be understood that motor 50 could be an electric motor driven by the 12-volt system of the vehicle 13. Also, however, it could be a hydraulic motor system with electrical switch system controls.

Electric control of the entire system is achieved by means of an electric circuit 60 shown in FIG. 5. It will be seen that limit switches, a retracted limit switch 61, and an extended position limit switch 62, said limits on the travel of the bracket 11. Buttress plate 31 serves as a limit switch operating arm.

In the preferred form of the invention, the door of the vehicle 15 operates a pair of door switches 65 and 66, switch 65 serving to start the reversible motor 50 in an extending direction of rotation when the vehicle door 15 is open, and the switch 66 starting the reversible motor 50 in a retracting direction when the door 15 is closed.

A 12 volt battery 67 delivers electrical power to motor 50 in either retracting or extending direction depending on the conditions of switches in circuit 20. Line 68 is connected to switches 65 and 66, which selectively deliver electrical current to motor 50, through lines 69 or 70, all in a manner well known to those skilled in the art of electrical circuit connection.

I claim:

1. A retractable step assembly for mounting to a vehicle frame under the vehicle door, which assembly includes:
   a bearing-support structure, including mounting means for mounting said structure on said vehicle frame, a bracket shaft bearing means mounted on said bearing support structure, said bracket shaft bearing means having an axis rising upwardly and outwardly toward the door of said vehicle, and a screw pivot mount means having an axis parallel to the axis of said bracket shaft bearing means, said screw pivot mount means being mounted on said bearing-support structure but spaced to one side of said bracket shaft bearing means;
   an inclined bracket shaft rotatably mounted on said bracket shaft bearing means;
   a crank arm extending from said bracket shaft;
   a nut pivotally mounted to the extended end of said crank arm;
   a screw actuator system, including an actuating screw having a first end threadably received in said nut, and a second end received in a drive gear pivotally mounted on said screw pivot mount; and a reversible motor mounted on said drive gear and adapted to rotate said actuating screw;
   a bracket extending from said bracket shaft, said bracket being movable by rotation of said shaft between a retracted position under said vehicle and an extended position with its extended end outboard of the side of said vehicle, under said vehicle door; and
   a tread supported at the outer end of said bracket, and adapted to locate at a step position below the middle of said vehicle door when said bracket is moved to its extended position.

2. A retractable step assembly as described in claim 1, which includes automatic movement limiting means for said bracket, said means comprising:
   a retracted position limit switch mounted in said bearing-support structure, said switch being operable when actuated to terminate the supply of power to said reversible motor, when said motor is rotating in a bracket retracting direction;
   an extended limit switch mounted in said bearing-support structure, said switch being adapted, when actuated, to terminate the power to said reversible motor, when said motor is rotating in a bracket extending direction; and
   a limit switch actuating arm extending from said bracket shaft and adapted to actuate said limit switches in the retracted and extended positions, respectively, of said bracket.

3. A retractable step assembly as described in claim 2, which is automatically operated by said vehicle door, which step assembly includes:
   a selective switch means mounted in said vehicle adjacent said vehicle door and operated by said vehicle door, said selected switch means having a first position for supplying power to drive said motor in a retracting direction when said vehicle door is closed, and a second position for supplying power to said motor in an extending direction when said vehicle door is open; and
   electric circuit means connecting the first and second positions of said selective switch in series with said retraction limit switch and said extension limit switch, respectively, to provide automatic starting of said motor by the operation of said vehicle door on said selective switch, and automatic stopping of said motor by the actuation of one of said limit switches by said limit switch actuating arm.

* * * * *